United States Patent [19]
Waehner

[11] Patent Number: 5,747,737
[45] Date of Patent: May 5, 1998

[54] INTERNALLY CONNECTED JUNCTION BOX

[75] Inventor: Keith David Waehner, Allegany, N.Y.

[73] Assignee: Keith D. Waehner, Allegany, N.Y.

[21] Appl. No.: 602,925

[22] Filed: Feb. 16, 1996

[51] Int. Cl.[6] .................................................. H02G 3/12
[52] U.S. Cl. ............................................................ 174/59
[58] Field of Search ........................ 174/59, 53; 439/721, 439/723, 724, 798

[56] References Cited

U.S. PATENT DOCUMENTS

| | | |
|---|---|---|
| 4,195,194 | 3/1980 | Kuster et al. ............................ 174/59 |
| 5,430,619 | 7/1995 | Lindenbaum .......................... 361/823 |

*Primary Examiner*—Kristine L. Kincaid
*Assistant Examiner*—Joseph Waks
*Attorney, Agent, or Firm*—Friedman Siegelbaum LLP

[57] ABSTRACT

The Internally Connected Junction Box includes a plurality of rectangular blocks placed on a base of an electrical box in three rows and staggered to form walls of three different heights, each block having a bore through the entire length to accommodate a metal rod and a plurality of mounting blocks arranged on top of rectangular blocks at regular intervals designed to accommodate hot wires in the back row, neutral wires in the second row and ground wires in the front row. One wall of the junction box has a plurality of openings, each opening being positioned opposite one of the stations on a rectangular block. Connecting wires of three types can be inserted through selected openings to the stations opposite the openings, whereby a plurality of electrical wires can be connected to each other internally.

1 Claim, 3 Drawing Sheets

INTERNALLY CONNECTED JUNCTION BOX

BACKGROUND OF THE INVENTION

1. Field of the Invention

The invention lies in the field of electrical wiring of residential and commercial buildings. It is specifically concerned with the design of the junction box, which establishes the interconnection between wires that supply the power to the building and wires that distribute the power to switches, electrical fixtures and electrical outlets.

2. Description of Prior Art

The old style junction box consisted of one metal box with cover, romex connectors, and wire nuts. Once the wires were secured to the box, common wires were joined together using a wire nut. Sometimes a piece of electrical tape was added to keep the wire nut from coming loose. Then the wires were jammed into the box and the cover would hold them in place. This process made it very difficult to add more circuits to that box. An electrician would either have to break one of the lines and add another box, or run new lines all the way back to the panel box.

One method of overcoming the limitations of the old style junction box has been achieved in the prior art by providing a junction box containing three circuit boards, one each for the "hot" wire, the "neutral" wire and the "ground" wire. The shape of the junction box and the circuit boards could be square, round or any shape. The circuit boards, having the same shape as the junction box, had a circumference slightly smaller than the circumference of the junction box, and were assembled co-axially within the box. Each of the circuit boards had a plurality of terminals occupied by connectors (fasteners), attached near the periphery of the boards. In the wall of the junction box there was a plurality of small diameter openings, each of the openings positioned opposite one of the fasteners on one of the circuit boards, so that a bare electrical wire could be inserted through the opening into the corresponding fastener opposite that opening.

In another type of junction box described in the prior art, three conductors of large size wires are brought in at a point to each of the circuit boards. Wires leading to electrical outlets are inserted into apppropriate fastenings, so that a plurality of output circuits are automatically connected to the input circuits, precluding the need to twist and fasten wires together inside the junction box.

SUMMARY OF THE INVENTION

The object of the invention is to provide a junction box which streamlines the process of adding or removing electrical circuits to or from a junction box. It is a further object of this invention to provide a junction box designed for interconnection of a plurality of electrical wires. It overcomes the limitations of the old style junction box by providing three circuit boards, one each for the "hot" wires, the "neutral" wires, and the "ground" wires. It is distinguished from prior art in that its circuit boards are designed as rectangular blocks arranged in three rows, each rectangular block having a bore extending throughout the length of the block, containing a rod made of conductive material. Stationed at regular intervals along the top of the uppermost rectangular block in each row are mounting blocks which provide the means for receiving a connecting wire. Mounting blocks in the back row receive the "hot" wires, while mounting blocks in the second row receive the "neutral" wires, and mounting blocks in the front row receive the "ground" wires. Each mounting block contains a set screw, disposed in threaded relation to the mounting block, having a flat head exposed on the upper surface of the mounting block, providing the means to receive an electrical connecting wire for secured electrical relation relative to the mounting block, and extending downward through the mounting block and part of the rectangular block to make contact with the conducting rod. The conducting rod provides a means for connecting the wire held in place by a set screw at one mounting block to a wire similarly secured at another station on the same rectangular block. In one wall of the junction box there are a plurality of small diameter openings, each of the openings being positioned opposite one of the stations on a rectangular block. Connecting wires of three types, "hot", "neutral" and "ground", bare at the end, can be inserted through selected openings to the stations opposite the openings, whereby a plurality of electrical wires can be connected to each other internally.

In this junction box circuit boards with several stations have been incorporated. Wires are easily connected to a station. Extra stations are present for future additions to the junction box. These stations make adding or removing wires quicker, easier, and safer.

BRIEF DESCRIPTION OF THE DRAWINGS

These objects and advantages of this invention will be evident from the following description, taken in conjunction with the appended drawings in which.

DESCRIPTION OF THE PREFERRED EMBODIMENT

Figure 1:
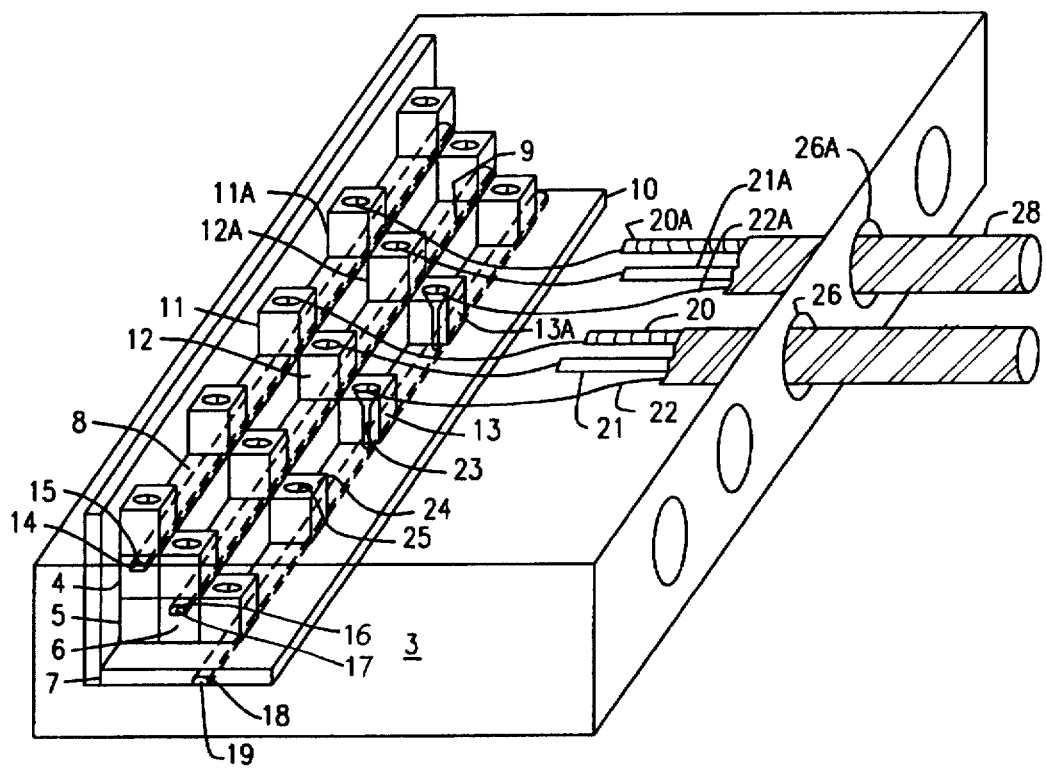
FIG. 1 illustrates the internally connected junction box.

Referring now to FIG. 1 of the drawings, there is shown in schematic fashion one embodiment of this invention. The drawing represents a junction box, indicated generally by the numeral 1, constructed of nonconducting material, having a square or circular base 2 and a circumferential wall 3.

Horizontal rectangular blocks, such as 4,5,6 and 7, are placed on the base 2 of the junction box in three rows, the back row 8 having three horizontal rectangular blocks, one placed above the other, the second row 9 having two horizontal rectangular blocks, one placed above the other, and the front row 10 having a single horizontal rectangular block. The horizontal rectangular blocks 4,5,6 and 7 may be attached to each other and 7 may be attached to the base 2 by any means of attachment such as bonding adhesive or screws. Mounting blocks 11, 11A, 12, 12A, 13 and 13A are placed at are placed at regular intervals or stations along the uppermost rectangular block in each row. In the back row 8, stations 11 and 11A are connected internally by means of a metal rod 14 contained in a bore 15 running the entire length of the rectangular block. In the second row 9, stations 12 and 12A are connected internally by means of a metal rod 16 contained in a bore 17 running the entire length of the rectangular block. In the front row 10, stations 13 and 13A are connected internally by means of a metal rod 18 contained in a bore 19 running the entire length of the rectangular block. Mounting blocks in the back row 8 receive "hot" connecting wires 20 and 20A, while mounting blocks in the second row receive "neutral" connecting wires 21 and 21A, and mounting blocks in the front row 10 receive "ground" wires.

Each mounting block has a set screw 23 disposed in threaded relation to it. At the top surface 24 of the mounting block the flat head 25 of the set screw is exposed, providing the means for receiving the connecting wire 22 in the mounting block. Inside the mounting block the set screw 23 makes contact with the metal rod 18, providing a means for connecting the wire 22 secured by the set screw 23 to the metal rod 18.

Figure 3:
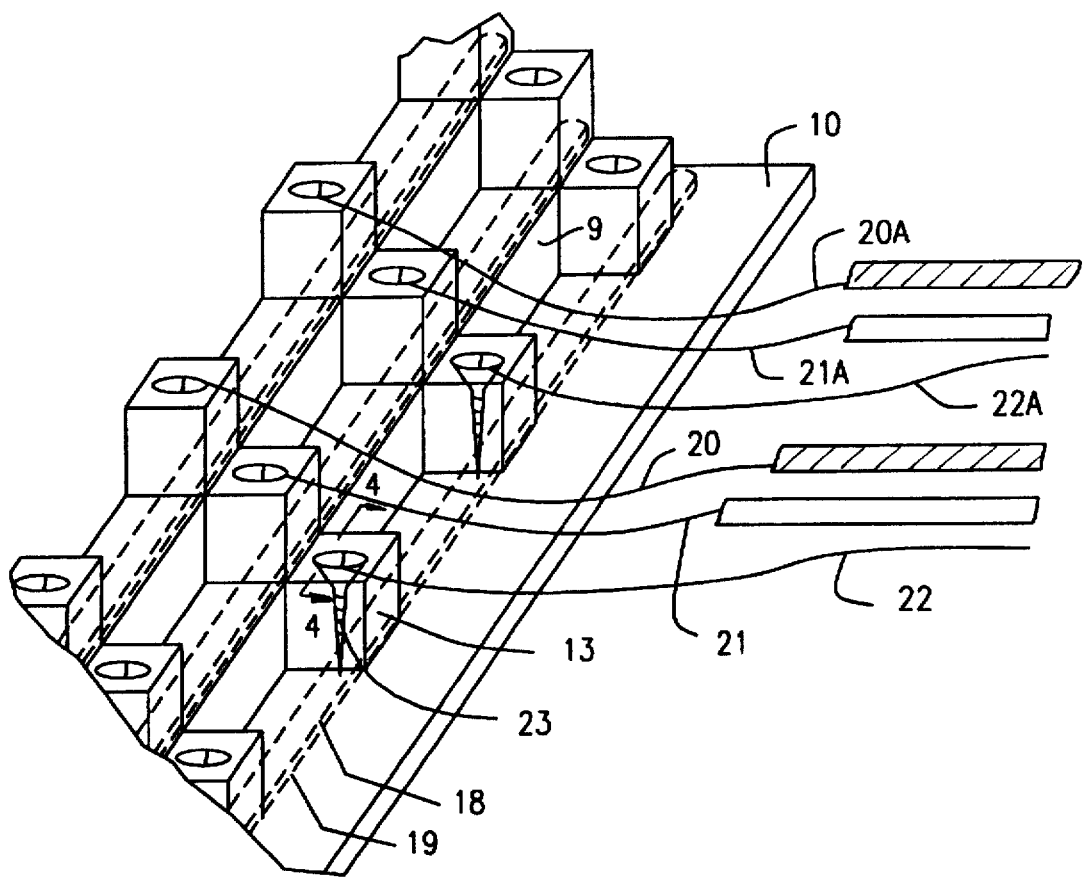
FIG. 3 is a partial view of the junction box illustrating the internal interconnection between the connecting wires secured by set screws.

Small diameter openings 26 and 26A, slightly larger in diameter than an insulated connecting wire 28, are placed in the wall 3 of the junction box 1. Each opening is positioned opposite one of the stations, or mounting blocks 13 and 13A, so that electrical wires 20 and 21, bare at the end and electrical wire 22, can be inserted through an opening 26 to the station 5, 11, 12 and 13 opposite that opening similarly, electrical wires 20A and 21A, bare at the end, and electrical wire 22A can be inserted through an opening 26A to the stations 11A, 12A and 13A opposite that opening. Electrical wires 20, 21 and 22 are secured by the set screws in the mounting blocks 11, 12 and 13 respectively. Electrical wires 20A, 21A and 22A are secured by the set screws in the mounting blocks 11A, 12A and 13A respectively. The set screws in mounting blocks 11 and 11A touch the metal rod 14 below them, and are interconnected by it. The electrical wires 20 and 20A are connected to the set screws in mounting blocks 11 and 11A and are therefore also interconnected though the metal rod 14. Secondly, the set screws in mounting blocks 12 and 12A touch the metal rod 16, and are interconnected by it. The electrical wires 21 and 21A are connected to the set screws in mounting blocks 12 and 12A, and are therefore also interconnected through the metal rod 16. Similarly, the set screws in mounting blocks 13 and 13A touch the metal rod 18, and are interconnected by it. The electrical wires 22 and 22A are connected to the set screws in mounting blocks 13 and 13A and are therefore also interconnected through the metal rod 18. FIG. 3 is a partial view of the junction box illustrating the internal interconnection between the connecting wires secured by set screws.

Figure 4:
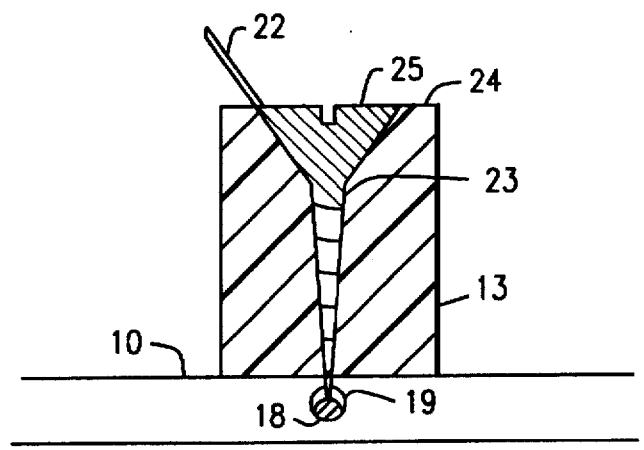
FIG. 4 is a sectional view showing a connecting wire secured by a screw and a metal rod located below the screw, which is in contact with the screw and connects it to other screws along the same horizontal rectangular block.

FIG. 4 is a sectional view showing a connecting wire secured by a screw, and a metal rod located below the screw, which is in contact with the screw and connects it to other screws along the same horizontal rectangular block.

Figure 2:
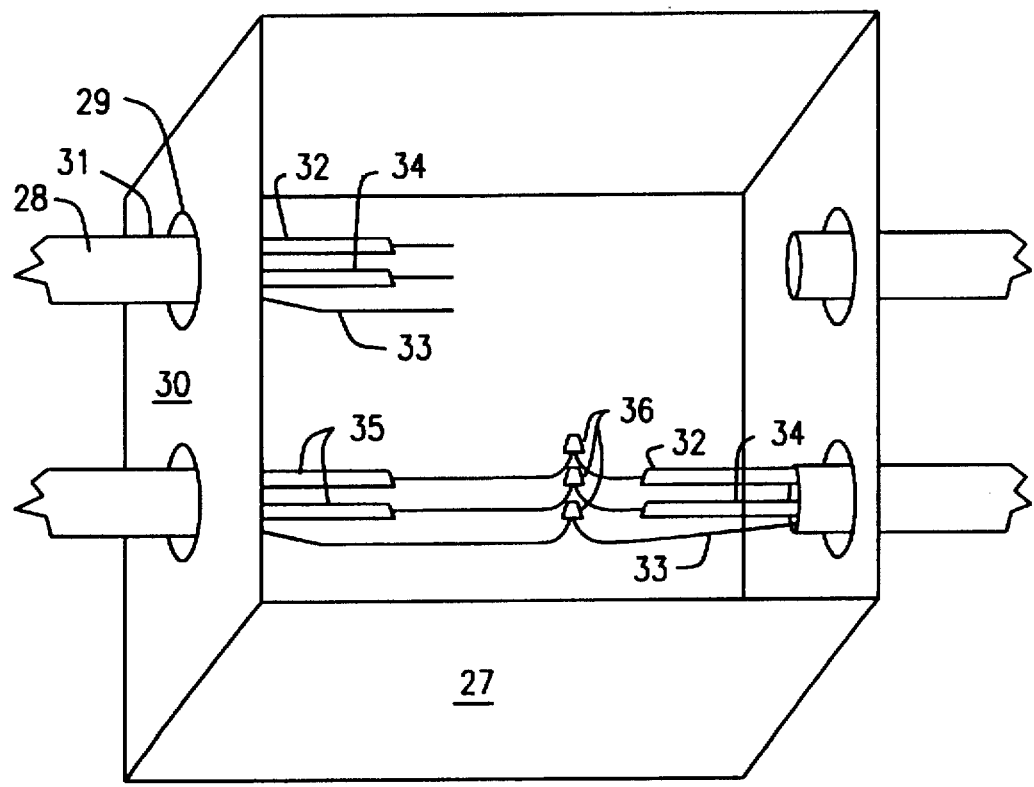
FIG. 2 illustrates the old style junction box of the prior art.

Referring now to FIG. 2 of the drawings, in the old style junction box 24, large diameter wires 28 are brought into the junction box through large diameter openings 29 in the wall 30 of the junction box 27. Inside the box 27 the protective insulation 31 of each large diameter wire is removed, exposing three small diameter wires: the "hot" wire 32 and neutral wire 34 which are insulated, and the ground wire 33. The insulation 35 is removed over the end portion of the "hot" and "neutral" wires. Then the common wires comprising each large diameter wire are joined together using wire nuts 36.

The advantage of the internally connected junction box 1 is that a complicated circuit can be wired with little more time than it takes to remove the insulation 35 from the tips of the wires, to insert them in the proper openings in the circumferential wall 3 of the junction box 1, and to secure each one with a set screw 23.

While the invention has been described with a certain amount of particularity, it is intended that many changes may be made in the details of construction without departing from the spirit and scope of this disclosure. It is understood that the invention is to be limited only by the scope of the attached claim, including the full range of equivalency to which each element thereof is entitled.

What is claimed is:

1. An internally connected electrical junction box comprising:

a junction box made of nonconductive material, having a base of lateral dimension and a circumferential wall;

a plurality of horizontal rectangular blocks having a dimension of length less than said lateral dimension of said base of said junction box said blocks being, placed on said base of said junction box in parallel spaced relation in back, middle and front rows, the back row having three of the horizontal rectangular blocks, one placed substantially above the other to form a wall, the middle row having two of the horizontal rectangular blocks, one placed substantially above the other to form a shorter wall, and the front row having a single one of the horizontal rectangular blocks;

a plurality of mounting blocks placed at regular intervals or stations along uppermost one of the rectangular blocks in each row, each said mounting block providing means for receiving a connecting wire, the connecting wires being of three types: hot wires, neutral wires, and ground wires, said mounting blocks in the back row receiving said hot wires, said mounting blocks in the middle row receiving said neutral wires, and said mounting blocks in the front row receiving said ground wires;

the plurality of horizontal rectangular blocks having portions defining a bore through entire length of each said block, and having a metal rod made of conductive material contained in the bore of each said rectangular block, providing means for connecting said intervals or stations internally;

a set screw disposed in threaded relation to each said mounting block, having a flat head exposed at top of said mounting block, providing means to receive the electrical connecting wire to secure the connecting wire in said mounting block and to interconnect the connecting wire with said metal rod;

means for connecting the connecting wire held in place by said set screw at one of the mounting blocks to the connecting wire secured at another of said intervals or stations; and a plurality of openings in said circumferential wall, each of said openings positioned opposite one of said intervals or stations on said rectangular blocks, so that one of the connecting wires of selected diameter can be inserted through one of said plurality of openings to one of said intervals or stations opposite one of said openings; whereby a plurality of said connecting wires can be inserted into said openings for interconnection in said mounting blocks.

* * * * *